United States Patent [19]
Lee et al.

[11] Patent Number: 5,528,580
[45] Date of Patent: Jun. 18, 1996

[54] ADD-DROP CONTROL APPARATUS

[75] Inventors: Sang H. Lee; Jung H. Ko; Jong H. Kim; Kyung K. Jeon, all of Daejeon, Rep. of Korea

[73] Assignees: Electronics and Telecommunications Research Institute; Korea Telecommunication Authority, both of Seoul, Rep. of Korea

[21] Appl. No.: 409,151

[22] Filed: Mar. 23, 1995

[30] Foreign Application Priority Data

Dec. 21, 1994 [KR] Rep. of Korea .................. 94-35749

[51] Int. Cl.$^6$ ........................................... H04J 3/00
[52] U.S. Cl. .................. 370/16.1; 370/55; 370/85.15; 370/112; 340/825.05; 340/827; 395/182.02; 375/373
[58] Field of Search ............................... 370/16.1, 55, 80, 370/85.5, 85.12, 85.15, 102, 14, 15, 16, 53, 54, 112, 110.1, 79, 105.3; 364/724.1; 340/827, 825.05, 825.17, 825.32, 826, 825.16; 395/180, 181, 182.01, 182.02; 375/363, 371, 372, 373, 374

[56] References Cited

U.S. PATENT DOCUMENTS

| | | | |
|---|---|---|---|
| 4,716,561 | 12/1987 | Angell et al. .............. | 370/55 |
| 5,287,513 | 2/1994 | Ferguson .................... | 370/55 |
| 5,307,353 | 4/1994 | Yamashita ................. | 370/16.1 |
| 5,311,501 | 5/1994 | Tahatsu .................... | 370/55 |

OTHER PUBLICATIONS

The F1-2000 OC-48 Lightwave System, Peter F. DeDuck and Steven R. Johnson.

*Primary Examiner*—Alpus H. Hsu
*Assistant Examiner*—Ricky Q. Ngo
*Attorney, Agent, or Firm*—Blakely, Sokoloff, Taylor & Zafman

[57] ABSTRACT

An add-drop control apparatus includes first and second data input units for inputting external first and second data signals, respectively, a frame phase arrangement unit for arranging phases of an external add data signal, an add data controller for transferring a first add data signal from the frame phase arrangement unit to a host stage in a selected one of a plurality of operating modes under control of a processor, a drop data controller for transferring selectively first and second drop data signals from the first and second data input units and a local loop back data signal from the add data controller to a tributary stage in the selected operating mode under the control of the processor, first and second data output controllers for transferring selectively first and second remote loop back data signals from the first and second data input units, first and second through data signals from the second and first data input units and second and third add data signal signals from the add data controller externally in the selected operating mode under the control of the processor, respectively, and an alarm indication signal insertion controller for checking an external add frame synchronous signal and outputting an alarm indication signal control signal to the add data controller in accordance with the checked result.

9 Claims, 9 Drawing Sheets

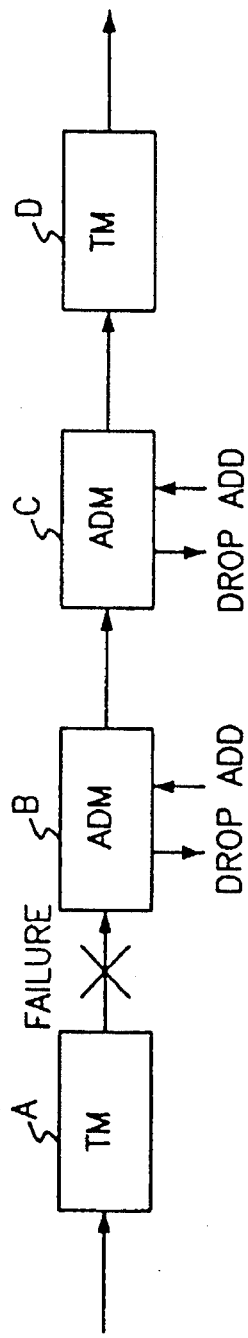
FIG. I
PRIOR ART
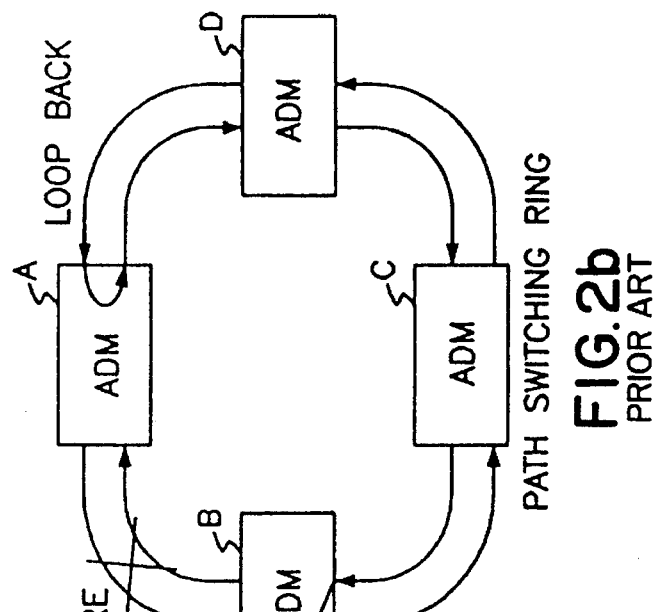
FIG. 2b
PRIOR ART
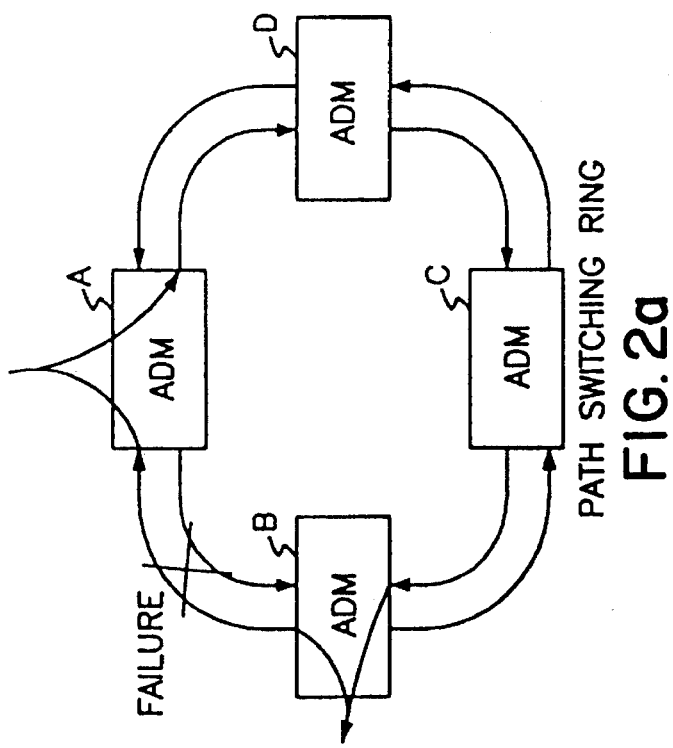
FIG. 2a
PRIOR ART

ADD-DROP CONTROL APPARATUS

BACKGROUND OF THE INVENTION

Field of the Invention

The present invention relates in general to an add-drop control apparatus, and more particularly to an add-drop control apparatus for enhancing a flexibility, a reliability and a self-healing function-based survivability of a synchronous digital hierarchy (SDH) synchronous transfer module-16 (STM-16) optical transfer system which is a synchronous digital transfer system.

Description of the Prior Art

FIG. 1 shows a schematic construction of a conventional transfer line network with a linear chain structure, to which a synchronous digital transfer system is applied, and FIGS. 2a and 2b shows a schematic construction of another conventional transfer line network with a ring structure, to which the synchronous digital transfer system is applied.

As shown in FIG. 1, the conventional transfer line network with the linear chain structure comprises a plurality of terminal multiplexers (TMs) and a plurality of add-drop multiplexers (ADMs).

The conventional transfer line network with the linear chain structure has a disadvantage in that, when a line fault such as a fiber cut or failure occurs between certain nodes, for example, A and B, communication between the node A and the nodes B, C and D is entirely interrupted.

In order to overcome the above problem, there has been proposed the conventional transfer line network with the ring structure as shown in FIGS. 2a and 2b. The conventional transfer line network with the ring structure is adapted to perform path switching, line switching (FIG. 2a) and loop back functions (FIG. 2b) upon the occurrence of the line fault to heal transfer data. Therefore, the conventional transfer line network with the ring structure can enhance a survivability of the synchronous digital transfer system based on a self-healing function.

However, in the above-mentioned conventional transfer line network with the ring structure, in order to apply terminal multiplexers of different signal paths, linear add-drop multiplexers, a path switching ring, a line switching ring and a loop back to the synchronous digital transfer system, a system mother board in which the signal paths are interconnected must be replaced according to each network construction, or signal interconnection cabling must be changed even when a single mother board has been employed.

SUMMARY OF THE INVENTION

Therefore, the present invention has been made in view of the above problems, and it is an object of the present invention to provide an add-drop control apparatus for controlling an add-drop operation of tributary signals using a microprocessor to enhance a flexibility, a reliability and a self-healing function-based survivability of an SDH STM-16 optical transfer system which is a synchronous digital transfer system.

In accordance with the present invention, the above and other objects can be accomplished by a provision of an add-drop control apparatus comprising first and second data input means for inputting external first and second data signals, respectively; frame phase arrangement means for arranging phases of an external add data signal; add data control means for transferring a first add data signal from the frame phase arrangement means to a host stage in a selected one of a plurality of operating modes under control of a processor; drop data control means for transferring selectively first and second drop data signals from the first and second data input means and a local loop back data signal from the add data control means to a tributary stage in the selected operating mode under the control of the processor; first data output control means for transferring selectively a first remote loop back data signal from the first data input means, a first through data signal from the second data input means and a second add data signal from the add data control means externally in the selected operating mode under the control of the processor; second data output control means for transferring selectively a second remote loop back data signal from the second data input means, a second through data signal from the first data input means and a third add data signal from the add data control means externally in the selected operating mode under the control of the processor; and alarm indication signal insertion control means for checking an external add frame synchronous signal to determine the insertion of an alarm indication signal and outputting an alarm indication signal control signal to the add data control means in accordance with the determined result.

BRIEF DESCRIPTION OF THE DRAWINGS

The above and other objects, features and advantages of the present invention will be more clearly understood from the following detailed description taken in conjunction with the accompanying drawings, in which:

FIG. 1 shows a schematic construction of a conventional transfer line network with a linear chain structure;

FIGS. 2a, 2b shows a schematic construction of another conventional transfer line network with a ring structure;

DETAILED DESCRIPTION OF THE PREFERRED EMBODIMENTS

Figure 3:
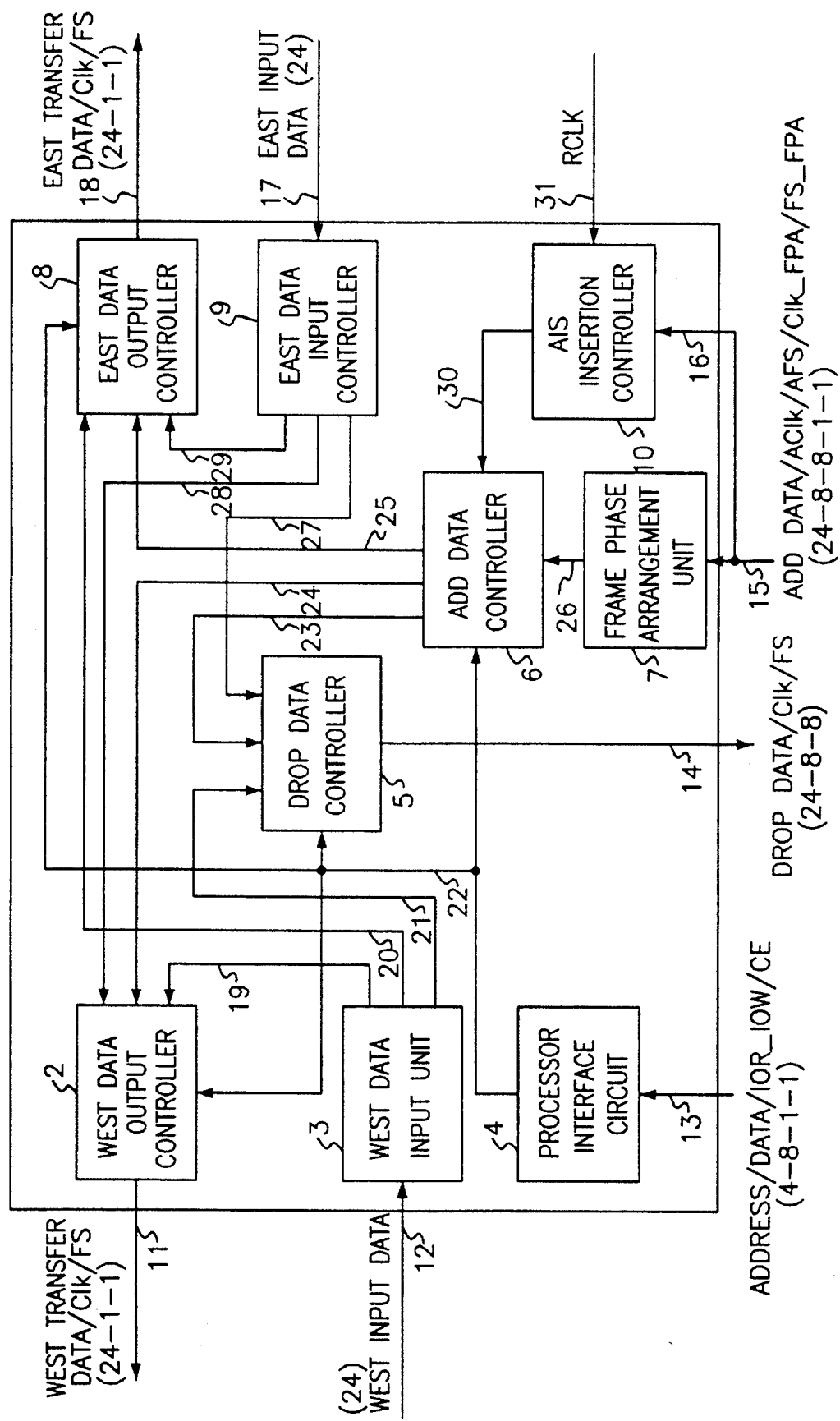
FIG. 3 is a block diagram of an add-drop control apparatus in accordance with the present invention.

Referring to FIG. 3, there is shown a block diagram of an add-drop control apparatus in accordance with the present invention. As shown in this drawing, the add-drop control apparatus comprises a west data output controller 2, a west data input unit 3, a processor interface circuit 4, a drop data controller 5, an add data controller 6, a frame phase arrangement unit 7, an east data output controller 8, an east data input unit 9, and an alarm indication signal (AIS) insertion controller 10.

The west data input unit 3 is adapted to receive a 24-channel administrative unit 32 (AU32) west input data signal of 51.84 Mbps from an input line 12. The west data input unit 3 retimes the received 24-channel AU32 west input data signal in response to a reference clock signal RCLK from an input line 31 and outputs the resultant remote loop back data signal, east through data signal and west drop data signal through output lines 19, 20 and 21, respectively.

The east data input unit 9 is adapted to receive a 24-channel AU32 east input data signal of 51.84 Mbps from an input line 17. The east data input unit 9 retimes the received 24-channel AU32 east input data signal in response to the reference clock signal RCLK from the input line 31 and outputs the resultant remote loop back data signal, west through data signal and east drop data signal through output lines 29, 28 and 27, respectively.

The frame phase arrangement unit 7 is adapted to receive a 24-channel add data signal from an input line 15. The frame phase arrangement unit 7 arranges slightly different phases of the received 24-channel add data signal and outputs the resultant add data signal through an output line 26 synchronously with a frame phase arrangement clock signal CLK_FPA from the input line 15.

The add data controller 6 is adapted to receive the add data signal from the output line 26 of the frame phase arrangement unit 7 and retime the received add data signal in response to the reference clock signal RCLK from the input line 31. The add data controller 6 selects one of the resultant local loop back data signal, west add data signal and east add data signal in response to a system configuration data signal from an output line 22 from the processor interface circuit 4 and outputs the selected data signal through a corresponding one of output lines 23, 24 and 25.

The drop data controller 5 is adapted to receive the local loop back data signal from the output line 23 of the add data controller 6, the west drop data signal from the output line 21 of the west data input unit 3 and the east drop data signal from the output line 27 of the east data input unit 9. The drop data controller 5 selects one of the received data signals in response to the system configuration data signal from the output line 22 from the processor interface circuit 4. Then, the drop data controller 5 retimes the selected data signal in response to the reference clock signal RCLK from the input line 31 and outputs the resultant data signal through an output line 14.

The west data output controller 2 is adapted to receive the remote loop back data signal from the output line 19 of the west data input unit 3, the west through data signal from the output line 28 of the east data input unit 9 and the west add data signal from the output line 24 of the add data controller 6. The west data output controller 2 selects one of the received data signals in response to the system configuration data signal from the output line 22 from the processor interface circuit 4. Then, the west data output controller 2 retimes the selected data signal in response to the reference clock signal RCLK from the input line 31 and outputs the resultant data signal through an output line 11.

The east data output controller 8 is adapted to receive the remote loop back data signal from the output line 29 of the east data input unit 9, the east through data signal from the output line 20 of the west data input unit 3 and the east add data signal from the output line 25 of the add data controller 6. The east data output controller 8 selects one of the received data signals in response to the system configuration data signal from the output line 22 from the processor interface circuit 4. Then, the east data output controller 8 retimes the selected data signal in response to the reference clock signal RCLK from the input line 31 and outputs the resultant data signal through an output line 18.

The AIS insertion controller 10 is adapted to receive an add frame synchronous signal AFS from an input line 16 and check the received add frame synchronous signal AFS. As a result of the checking, the AIS insertion controller 10 determines the insertion of an alarm indication signal AIS and outputs an AIS control signal to the add data controller 6 through an output line 30 in accordance with the determined result.

The system configuration data signal from the output line 22 from the processor interface circuit 4 is applied as a select signal to the west and east data output controllers 2 and 8, and the drop and add data controllers 5 and 6.

Figure 4:
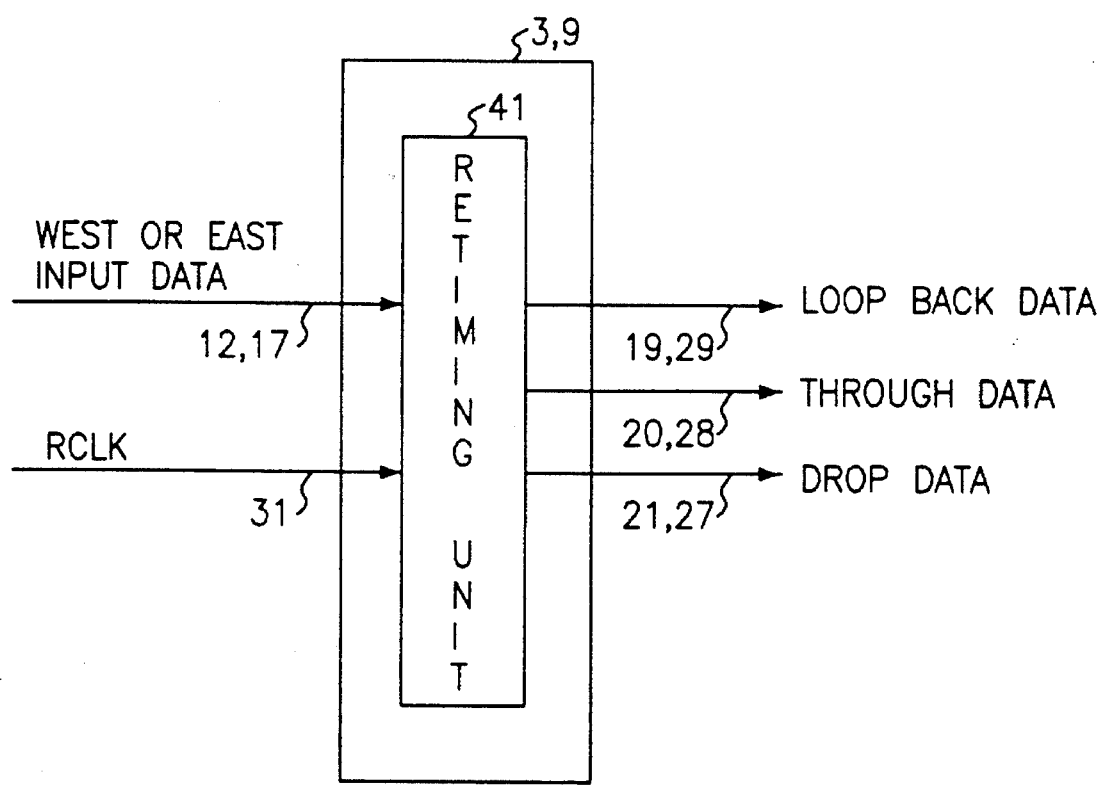
FIG. 4 is a detailed block diagram of a data input unit in FIG. 3.

Referring to FIG. 4, there is shown a detailed block diagram of each of the west and east data input units 3 and 9 in FIG. 3. As shown in this drawing, each of the west and east data input units 3 and 9 includes a retiming unit 41. The retiming unit 41 may include a flip-flop for retiming the 24-channel AU32 west or east input data signal of 51.84 Mbps from the input line 12 or 17 in response to the reference clock signal RCLK from the input line 31 and outputting the resultant remote loop back data signal, east or west through data signal and east or west drop data signal through the output lines 19 or 29, 20 or 28 and 21 or 27, respectively.

Figure 5:
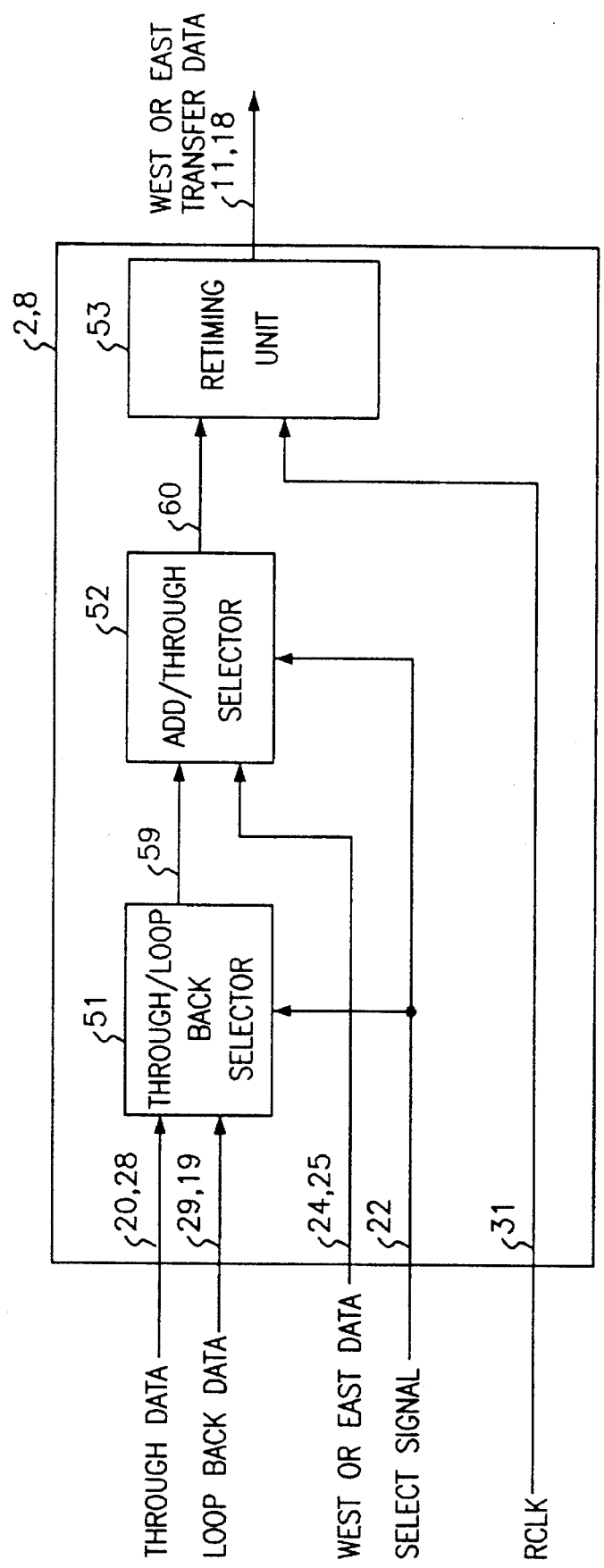
FIG. 5 is a detailed block diagram of a data output controller in FIG. 3.

Referring to FIG. 5, there is shown a detailed block diagram of each of the west and east data output controllers 2 and 8 in FIG. 3. As shown in this drawing, each of the west and east data output controllers 2 and 8 includes a through/loop back selector 51, an add/through selector 52, and a retiming unit 53. The through/loop back selector 51 and the add/through selector 52 may include multiplexers, respectively. Also, the retiming unit 41 may include a flip-flop.

In response to the select signal from the output line 22 from the processor interface circuit 4, the through/loop back selector 51 selects one of the east through data signal from the output line 20 of the west data input unit 3 and the remote loop back data signal from the output line 29 of the east data input unit 9 or one of the west through data signal from the output line 28 of the east data input unit 9 and the remote loop back data signal from the output line 19 of the west data input unit 3. Then, the through/loop back selector 51 outputs the selected data signal to the add/through selector 52 through an output line 59.

The remote loop back data signal from the output line 19 of the west data input unit 3 and the remote loop back data signal from the output line 29 of the east data input unit 9 may be test remote loop back data signals or ring switch loop back data signals for recovering a line fault such as a fiber cut.

In response to the select signal from the output line 22 from the processor interface circuit 4, the add/through selector 52 selects one of an output data signal from the output line 59 of the through/loop back selector 51 and the west or east add data signal from the output line 24 or 25 of the add data controller 6. Then, the add/through selector 52 outputs the selected data signal to the retiming unit 53 through an output line 60.

The retiming unit 53 retimes an output data signal from the output line 60 of the add/through selector 52 in response to the reference clock signal RCLK from the input line 31 and outputs the resultant data signal through the output line 11 or 18.

Figure 6:
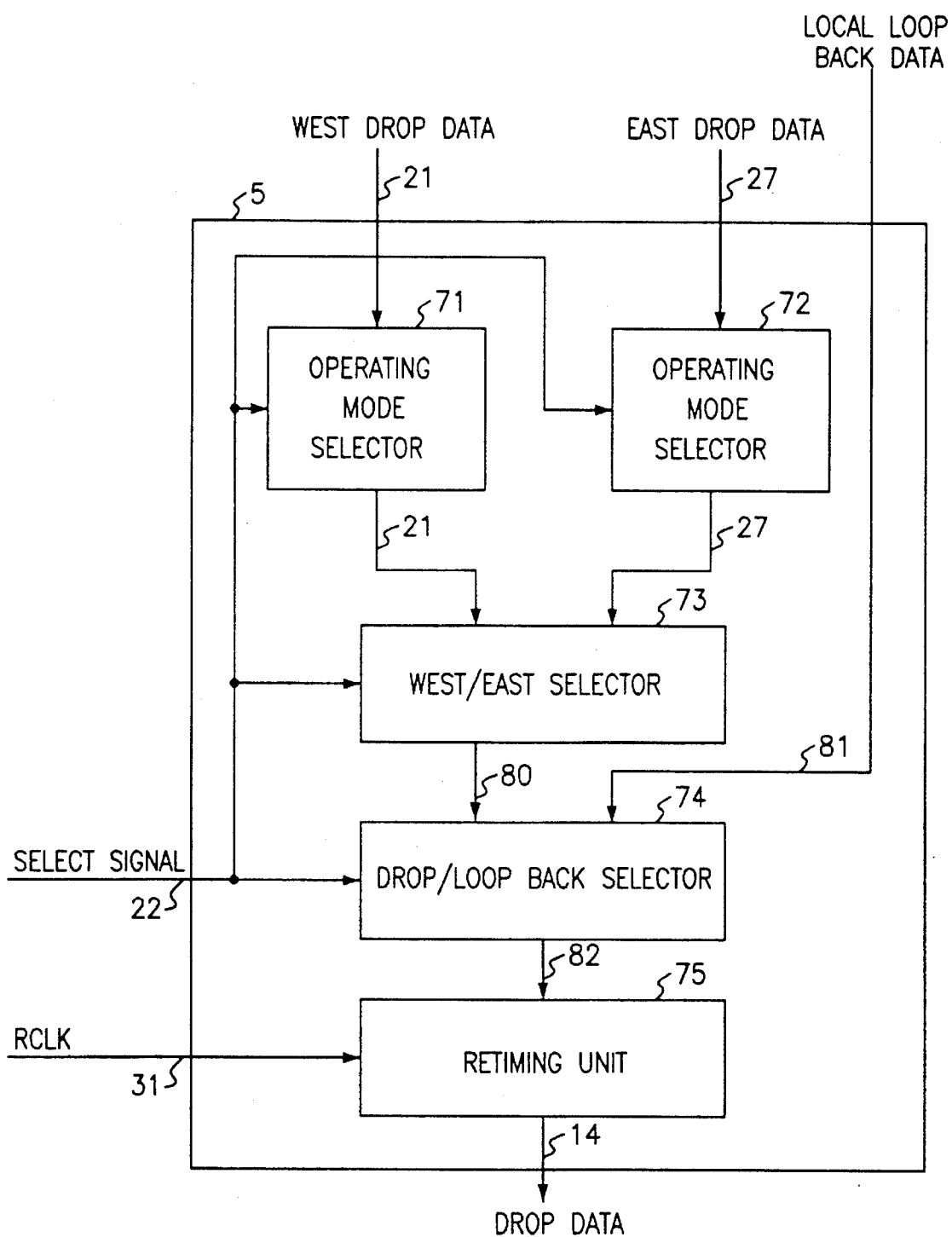
FIG. 6 is a detailed block diagram of a drop data controller in FIG. 3.

Referring to FIG. 6, there is shown a detailed block diagram of the drop data controller 5 in FIG. 3. As shown in this drawing, the drop data controller 5 includes first and second operating mode selectors 71 and 72, a west/east selector 73, a drop/loop back selector 74 and a retiming unit 75. The first and second operating mode selectors 71 and 72, the west/east selector 73 and the drop/loop back selector 74 may include multiplexers, respectively. Also, the retiming unit 75 may include a flip-flop.

The first operating mode selector 71 selects one of a plurality of operating modes in response to the select signal from the output line 22 from the processor interface circuit 4 and outputs the west drop data signal from the output line 21 of the west data input unit 3 to the west/east selector 73 in the selected operating mode. Similarly, the second operating mode selector 72 selects one of the plurality of operating modes in response to the select signal from the output line 22 from the processor interface circuit 4 and outputs the east drop data signal from the output line 27 of the east data input unit 9 to the west/east selector 73 in the selected operating mode.

The plurality of operating modes may be a linear add-drop multiplexing mode (linear-ADM), a unidirectional path switching add-drop multiplexing mode (UPS-ADM), a 2-fiber bidirectional line switching add-drop multiplexing mode (BLS/2-ADM) and an extra service 2-fiber bidirectional line switching add-drop multiplexing mode (BLS/2-ET-ADM).

The west/east selector 73 selects one of the west drop data signal from the first operating mode selector 71 and the east drop data signal from the second operating mode selector 72 in response to the select signal from the output line 22 from the processor interface circuit 4 and outputs the selected drop data signal to the drop/loop back selector 74 through an output line 80. The drop/loop back selector 74 selects one of an output data signal from the output line 80 of the west/east selector 73 and the local loop back data signal from the output line 23 of the add data controller 6 in response to the select signal from the output line 22 from the processor interface circuit 4 and outputs the selected data signal to the retiming unit 75 through an output line 82.

The retiming unit 75 retimes an output data signal from the output line 82 of the drop/loop back selector 74 in response to the reference clock signal RCLK from the input line 31 and outputs the resultant data signal through the output line 14.

Figure 7:
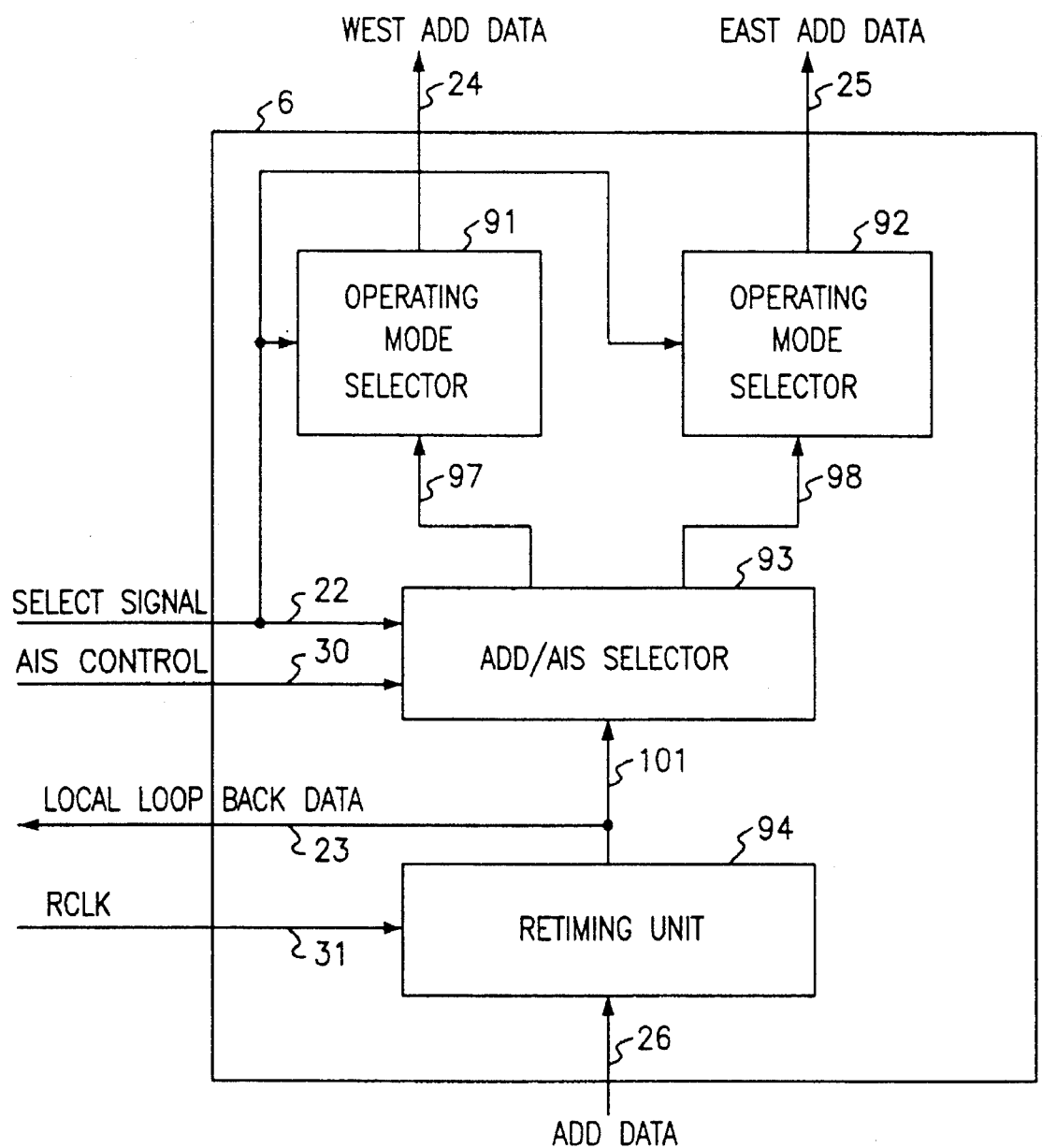
FIG. 7 is a detailed block diagram of an add data controller in FIG. 3.

Referring to FIG. 7, there is shown a detailed block diagram of the add data controller 6 in FIG. 3. As shown in this drawing, the add data controller 6 includes first and second operating mode selectors 91 and 92, an add/AIS selector 93 and a retiming unit 94. The first and second operating mode selectors 91 and 92 and the add/AIS selector 93 may include multiplexers, respectively. Also, the retiming unit 94 may include a flip-flop.

The retiming unit 94 retimes the add data signal from the output line 26 of the frame phase arrangement unit 7 in response to the reference clock signal RCLK from the input line 31 and outputs the resultant add data signal as the local loop back data signal through the output line 23. The resultant add data signal from the retiming unit 94 is also applied to the add/AIS selector 93 through an output line 101.

The add/AIS selector 93 selects one of the add data signal from the output line 101 of the retiming unit 94 and the alarm indication signal AIS in response to the select signal from the output line 22 from the processor interface circuit 4 and the AIS control signal from the output line 30 of the AIS insertion controller 10 and outputs the selected data signal to the first and second operating mode selectors 91 and 92, respectively, through output lines 97 and 98.

The first operating mode selector 91 selects one of the plurality of operating modes in response to the select signal from the output line 22 from the processor interface circuit 4 and outputs an output data signal from the output line 97 of the add/AIS selector 93 as the west add data signal to the west data output controller 2 through the output line 24 in the selected operating mode. Similarly, the second operating mode selector 92 selects one of the plurality of operating modes in response to the select signal from the output line 22 from the processor interface circuit 4 and outputs an output data signal from the output line 98 of the add/AIS selector 93 as the east add data signal to the east data output controller 8 through the output line 25 in the selected operating mode.

As stated previously, the plurality of operating modes may be the linear add-drop multiplexing mode (linear-ADM), the unidirectional path switching add-drop multiplexing mode (UPS-ADM), the 2-fiber bidirectional line switching add-drop multiplexing mode (BLS/2-ADM) and the extra service 2-fiber bidirectional line switching add-drop multiplexing mode (BLS/2-ET-ADM).

Figure 8:
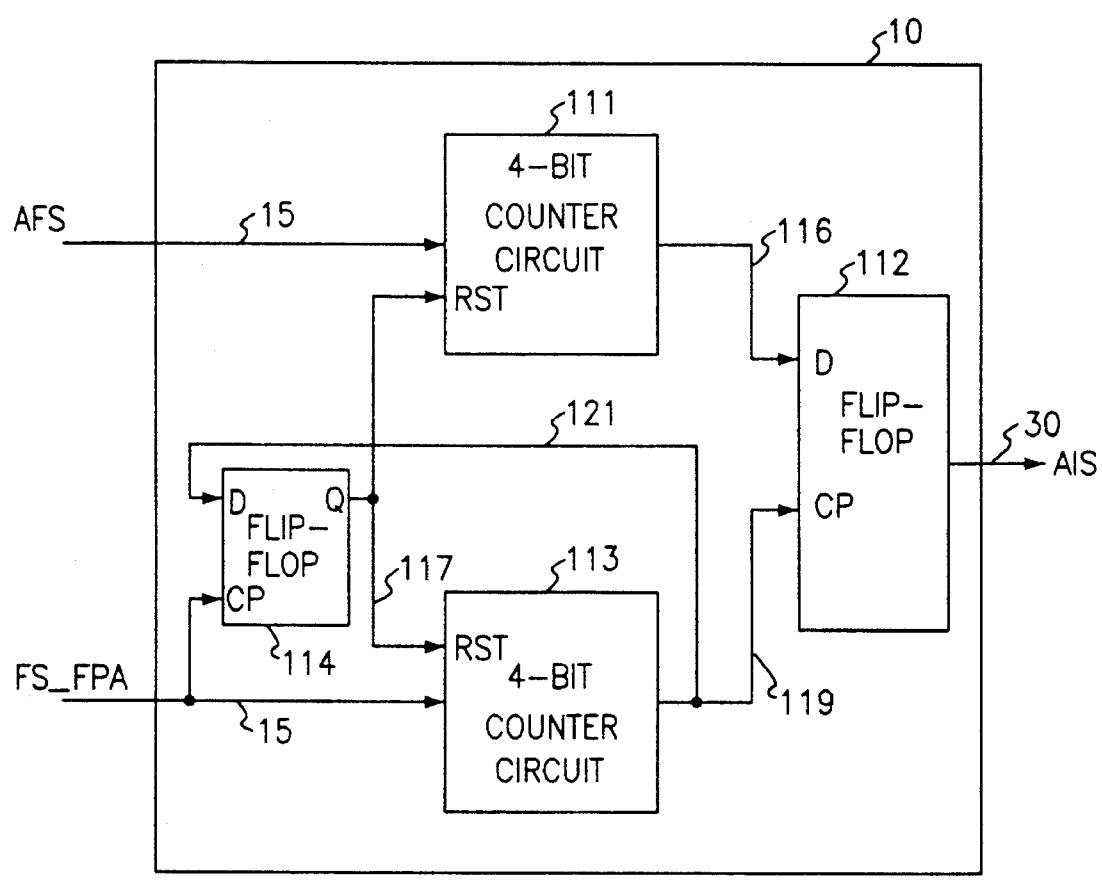
FIG. 8 is a detailed block diagram of an alarm indication signal insertion controller in FIG. 3.

Referring to FIG. 8, there is shown a detailed block diagram of the AIS insertion controller 10 in FIG. 3. The AIS insertion controller 10 functions to insert the alarm indication signal AIS into a host stage upon occurrence of a signal fault or a card detachment of a tributary unit in an SDH STM-16 optical transfer system. Also, the AIS insertion controller 10 releases the alarm indication signal AIS if the signal fault is solved.

As shown in FIG. 8, the AIS insertion controller 10 includes first and second 4-bit counter circuits 111 and 113, and first and second flip-flops 112 and 114.

The first 4-bit counter circuit 111 receives the add frame synchronous signal AFS from the input line 15 at its clock terminal every 125 μs to count it. The second 4-bit counter circuit 113 receives an reference frame synchronous signal FS_FPA from the input line 15 at its clock terminal every 125 μs to count it. The second 4-bit counter circuit 113 outputs a pulse when its count is 16. The first flip-flop 112 receives the output pulse from an output line 119 of the second 4-bit counter circuit 113 at its clock terminal and an output signal from an output line 116 of the first 4-bit counter circuit 111 at its data terminal. The first flip-flop 112 outputs the output signal from the output line 116 of the first 4-bit counter circuit 111 as the AIS control signal to the add data controller 6 through the output line 30 in response to the output pulse from the output line 119 of the second 4-bit counter circuit 113.

The second flip-flop 114 receives the reference frame synchronous signal FS_FPA from the input line 15 at its clock terminal and the output pulse from an output line 121 of the second 4-bit counter circuit 113 at its data terminal. The second flip-flop 114 resets the first and second 4-bit counter circuits 111 and 113 in response to the reference frame synchronous signal FS_FPA from the input line 15 and the output pulse from the output line 121 of the second 4-bit counter circuit 113.

Figure 9:
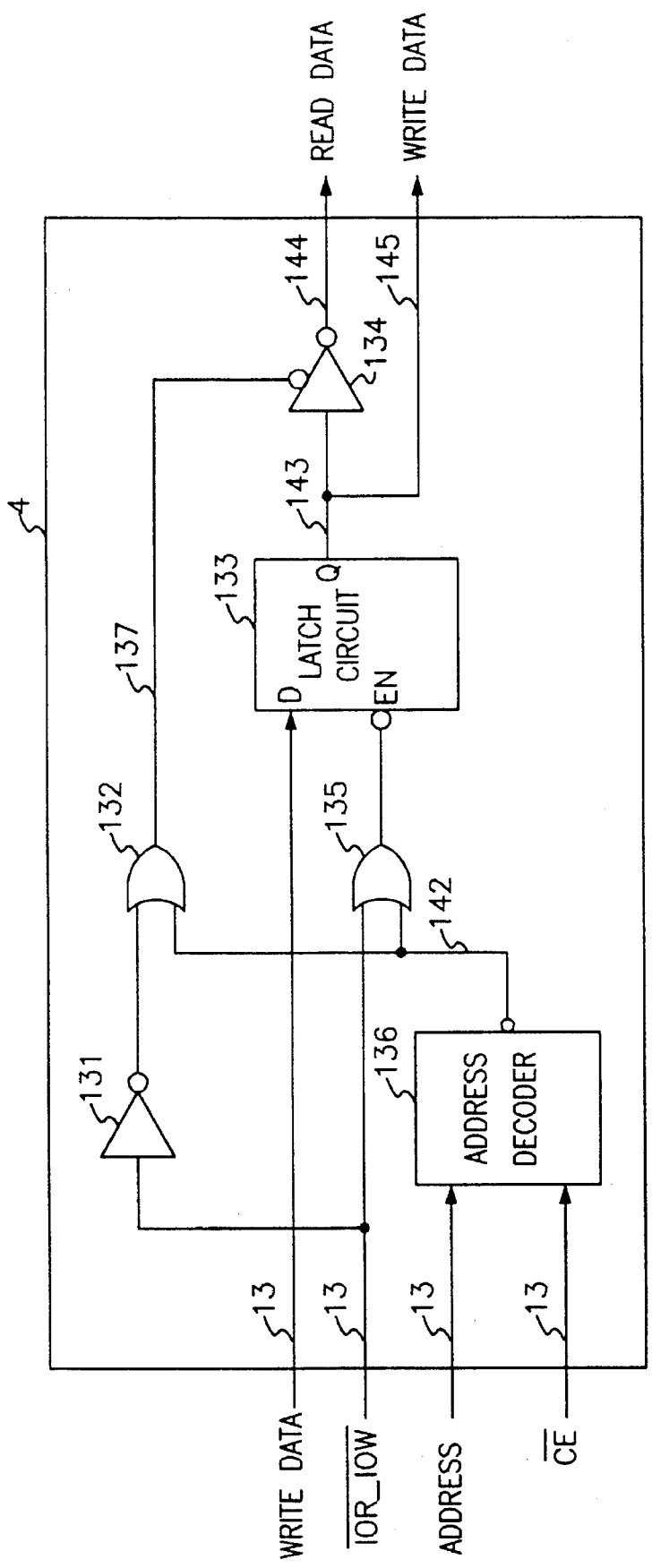
FIG. 9 is a detailed block diagram of a processor interface circuit in FIG. 3.

Referring to FIG. 9, there is shown a detailed block diagram of the processor interface circuit 4 in FIG. 3. As shown in this drawing, the processor interface circuit 4 includes an inverter 131, first and second OR gates 132 and 135, an address decoder 136, a latch circuit 133 and a 3-state buffer 134.

In a data write operation, the address decoder 136 decodes an address from an input line 13 in response to a chip enable signal /CE from the input line 13. As a result of the decoding, the address decoder 136 outputs an active signal to one input terminals of the OR gates 132 and 135 through an output line 142.

A read/write control signal /IOR—IOW from the input line 13 is applied to the other input terminal of the OR gate 135 and the inverter 131. If the read/write control signal/IOR__IOW from the input line 13 is low in logic, an output signal from the OR gate 135 is low in logic, thereby enabling the latch circuit 133. As being enabled, the latch circuit 133 outputs write data from the input line 13 at its output terminal Q through an output line 143. In this case, the 3-state buffer 134 is disabled because an output signal from the OR gate 132 is high in logic.

In a data read operation, the address decoder 136 decodes the address from the input line 13 in response to the chip enable signal/CE from the input line 13. As a result of the decoding, the address decoder 136 outputs the active signal to one input terminals of the OR gates 132 and 135 through the output line 142.

The read/write control signal/IOR__IOW from the input line 13 is applied to the other input terminal of the OR gate 135 and the inverter 131. If the read/write control signal/IOR__IOW from the input line 13 is high in logic, the output signal from the OR gate 135 is high in logic, thereby disabling the latch circuit 133. In this case, the 3-state buffer 134 is enabled because the output signal from the OR gate 132 is low in logic. As being enabled, the 3-state buffer 134 outputs the data held at the output terminal Q of the latch circuit 133 as read data through an output line 144.

Figure 10:
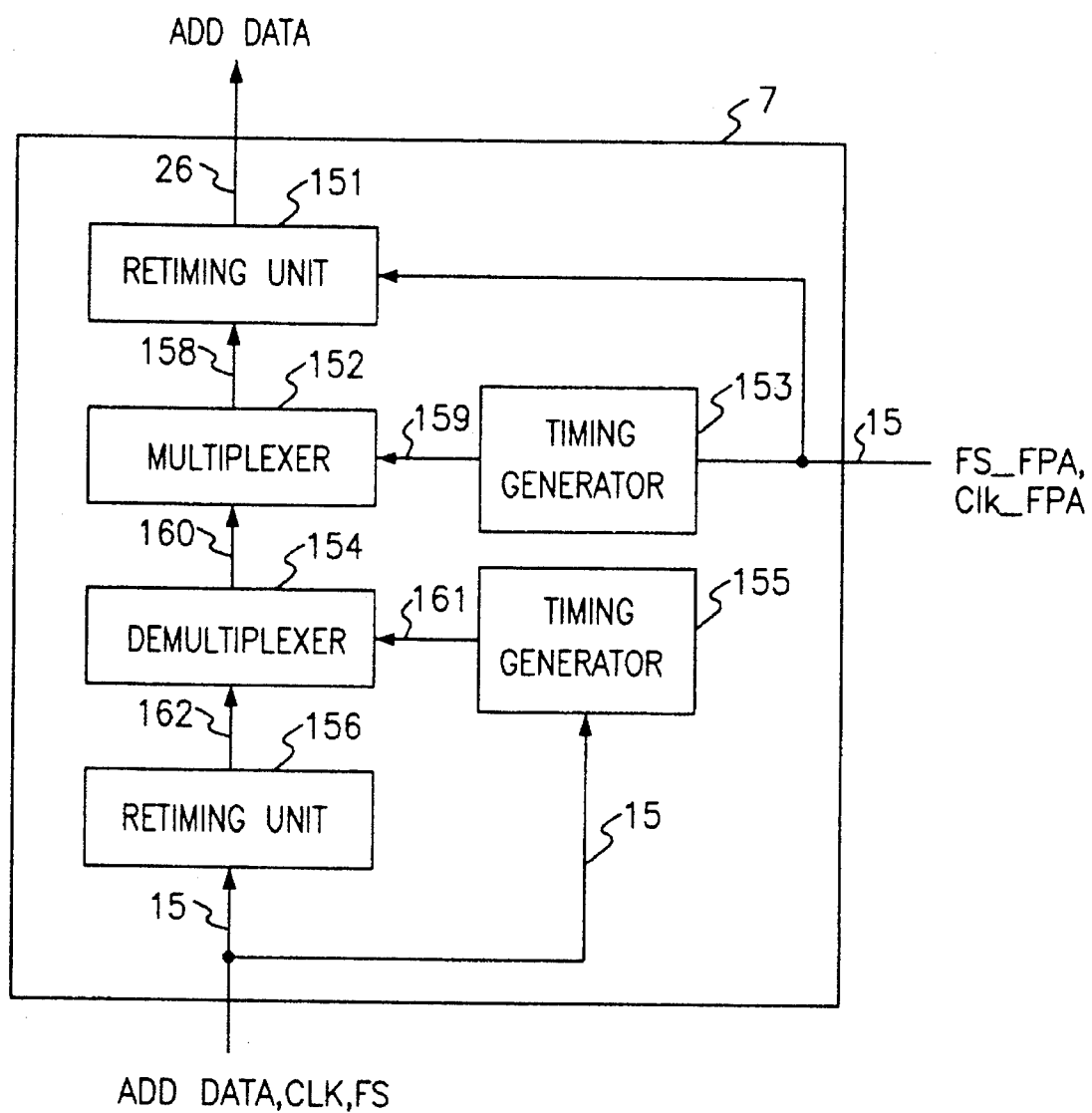
FIG. 10 is a detailed block diagram of a frame phase arrangement unit in FIG. 3.

Referring to FIG. 10, there is shown a detailed block diagram of the frame phase arrangement unit 7 in FIG. 3. As shown in this drawing, the frame phase arrangement unit 7 includes first and second retiming units 156 and 151, a demultiplexer 154, a multiplexer 152, and first and second timing generators 155 and 153.

The first retiming unit 156 may include a flip-flop. The first retiming unit 156 retimes the 24-channel add data signal, the add frame synchronous signal AFS and the reference frame synchronous signal FS__FPA from the input line 15 in response to an add clock signal CLK from the input line 15 and outputs the resultant serial data signal to the demultiplexer 154 through an output line 162.

The first timing generator 155 may include a flip-flop and a 6-frequency divider. The first timing generator 155 generates a first timing control signal in response to the add clock signal CLK from the input line 15 and outputs the generated first timing control signal to the demultiplexer 154 through an output line 161.

The demultiplexer 154 may include a 6-stage shift register and a flip-flop. The demultiplexer 154 converts the serial data signal from the output line 162 of the first retiming unit 156 into a parallel data signal in response to the first timing control signal from the output line 161 of the first timing generator 155. Then, the demultiplexer 154 outputs the parallel data signal to the multiplexer 152 through an output line 160.

The second timing generator 153 may include a flip-flop and a 6-frequency divider. The second timing generator 153 generates a second timing control signal in response to the reference frame synchronous signal FS__FPA and the frame phase arrangement clock signal CLK__FPA from the input line 15 and outputs the generated second timing control signal to the multiplexer 152 through an output line 159.

The multiplexer 152 6:1-multiplexes the parallel data signal from the output line 160 of the demultiplexer 154 in response to the second timing control signal from the output line 159 of the second timing generator 153 and outputs the resultant data signal to the second retiming unit 151 through an output line 158.

The second retiming unit 151 may include a flip-flop. The second retiming unit 151 retimes an output data signal from the output line 158 of the multiplexer 152 in response to the frame phase arrangement clock signal CLK__FPA from the input line 15 and outputs the resultant data signal as the add data signal to the add data controller 6 through the output line 26.

As apparent from the above description, according to the present invention, the add-drop control apparatus can control signal paths under control of a microprocessor according to each network construction. Therefore, there is no necessity for replacing a system mother board and changing complex signal interconnection cabling. Also, the add-drop control apparatus of the present invention can be applied to the four modes, the linear add-drop multiplexing mode (linear-ADM), the unidirectional path switching add-drop multiplexing mode (UPS-ADM), the 2-fiber bidirectional line switching add-drop multiplexing mode (BLS/2-ADM) and the extra service 2-fiber bidirectional line switching add-drop multiplexing mode (BLS/2-ET-ADM). Therefore, the add-drop control apparatus of the present invention can enhance a flexibility of the SDH STM-16 optical transfer system. Further, with the path switching, line switching and loop back functions, the add-drop control apparatus of the present invention can enhance a reliability and a survivability of the transfer data.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An add-drop control apparatus comprising:

first data input means for inputting a first external data signal, coupled to a first remote loop back data signal, a second through data signal, and a first drop data signal;

second data input means for inputting a second external data signal, coupled to a second remote loop back data signal, a first through data signal, and a second drop data signal;

frame phase arrangement means for arranging phases of an external add data signal and for generating a first add data signal;

add data control means for transferring the first add data signal from said frame phase arrangement means to a host stage in a selected one of a plurality of operating modes under control of a processor, said add data control means coupled to a local loop back data signal, and second and third add data signals;

drop data control means for transferring selectively the first and second drop data signals from said first and second data input means and the local loop back data signal from said add data control means to a tributary stage in the selected operating mode under the control of said processor;

first data output control means for transferring selectively the first remote loop back data signal from said first data input means, the first through data signal from said second data input means and the second add data signal from said add data control means externally in the selected operating mode under the control of said processor;

second data output control means for transferring selectively the second remote loop back data signal from said second data input means, the second through data signal from said first data input means and the third add data signal from said add data control means externally in the selected operating mode under the control of said processor; and alarm indication signal insertion control means for checking an external add frame synchronous signal to determine the insertion of an alarm indication signal and outputting an alarm indication signal to said add data control means in accordance with the determined result.

2. An add-drop control apparatus as set forth in claim 1, further comprising:

processor interface means for selecting one of said plurality of operating modes under the control of said processor and determining signal paths of said add and drop data control means and said first and second data output control means according to the selected operating mode.

3. An add-drop control apparatus as set forth in claim 2, wherein said processor interface means includes:

address decoding means for decoding an address from said processor in response to a chip enable signal from said processor and outputting an active signal in accordance with the decoded result;

inverting means for inverting a read/write control signal from said processor;

first ORing means for ORing the active signal from said address decoding means and an output signal from said inverting means;

second ORing means for ORing the active signal from said address decoding means and the read/write control signal from said processor;

latch means for inputting write data from said processor, said latch means being enabled in response to an output signal from said second ORing means to output the inputted write data; and 3-state buffering means for inverting output data from said latch means in response to an output signal from said first ORing means and outputting the inverted data as read data.

4. An add-drop control apparatus as set forth in claim 1, wherein each of said first and second data input means includes:

retiming means for retiming the external first or second data signal in response to a reference clock signal and outputting the resultant first or second remote loop back data signal to said first or second data output control means, the resultant second or first through data signal to said second or first data output control means and the resultant first or second drop data signal to said drop data control means.

5. An add-drop control apparatus as set forth in claim 1, wherein each of said first and second data output control means includes:

through/loop back selection means for selecting one of the second through data signal from said first data input means and the second remote loop back data signal from said second data input means or one of the first through data signal from said second data input means and the first remote loop back data signal from said first data input means under the control of said processor;

add/through selection means for selecting one of an output data signal from said through/loop back selection means and the second or third add data signal from said add data control means under the control of said processor; and retiming means for retiming an output data signal from said add/through selection means in response to a reference clock signal and outputting the resultant data signal externally.

6. An add-drop control apparatus as set forth in claim 1, wherein said drop data control means includes:

first operating mode selection means for selecting one of the plurality of operating modes under the control of said processor and outputting the first drop data signal from said first data input means in the selected operating mode;

second operating mode selection means for selecting one of the plurality of operating modes under the control of said processor and outputting the second drop data signal from said second data input means in the selected operating mode;

data selection means for selecting one of output data signals from said first and second operating mode selection means under the control of said processor;

drop/loop back selection means for selecting one of an output data signal from said data selection means and the local loop back data signal from said add data control means under the control of said processor; and retiming means for retiming an output data signal from said drop/loop back selection means in response to a reference clock signal and outputting the resultant data signal to said tributary stage.

7. An add-drop control apparatus as set forth in claim 1, wherein said add data control means includes:

retiming means for retiming the first add data signal from said frame phase arrangement means in response to a reference clock signal and outputting the resultant data signal as the local loop back data signal to said drop data control means;

add/alarm indication signal selection means for selecting one of an output data signal from said retiming means and the alarm indication signal under the control of said processor and in response to the alarm indication signal control signal from said alarm indication signal insertion control means;

first operating mode selection means for selecting one of the plurality of operating modes under the control of said processor and outputting an output data signal from said add/alarm indication signal selection means as the second add data signal to said first data output control means in the selected operating mode; and second operating mode selection means for selecting one of the plurality of operating modes under the control of said processor and outputting the output data signal from said add/alarm indication signal selection means as the third add data signal to said second data output control means in the selected operating mode.

8. An add-drop control apparatus as set forth in claim 1, wherein said alarm indication signal insertion control means includes:

first counting means for counting the external add frame synchronous signal;

second counting means for counting an external reference frame synchronous signal, said second counting means outputting a pulse when its count is a desired value;

first latch means for outputting an output signal from said first counting means as the alarm indication signal control signal to said add data control means in response to the output pulse from said second counting means; and second latch means for resetting said first and second counting means in response to the external reference frame synchronous signal and the output pulse from said second counting means.

9. An add-drop control apparatus as set forth in claim 1, wherein said frame phase arrangement means includes:

first retiming means for retiming the external add data signal, the external add frame synchronous signal and an external reference frame synchronous signal in response to an add clock signal;

first timing generation means for generating a first timing control signal in response to the add clock signal;

demultiplexing means for converting a serial data signal from said first retiming means into a parallel data signal in response to the first timing control signal from said first timing generation means;

second timing generation means for generating a second timing control signal in response to the external reference frame synchronous signal and an external frame phase arrangement clock signal;

multiplexing means for multiplexing the parallel data signal from said demultiplexing means in response to the second timing control signal from said second timing generation means; and second retiming means for retiming an output data signal from said multiplexing means in response to the external frame phase arrangement clock signal and outputting the resultant data signal as the first add data signal to said add data control means.

* * * * *